Dec. 6, 1955  T. W. MULLEN  2,725,663
RODENTICIDE DISPENSER
Filed Aug. 3, 1951  3 Sheets-Sheet 1
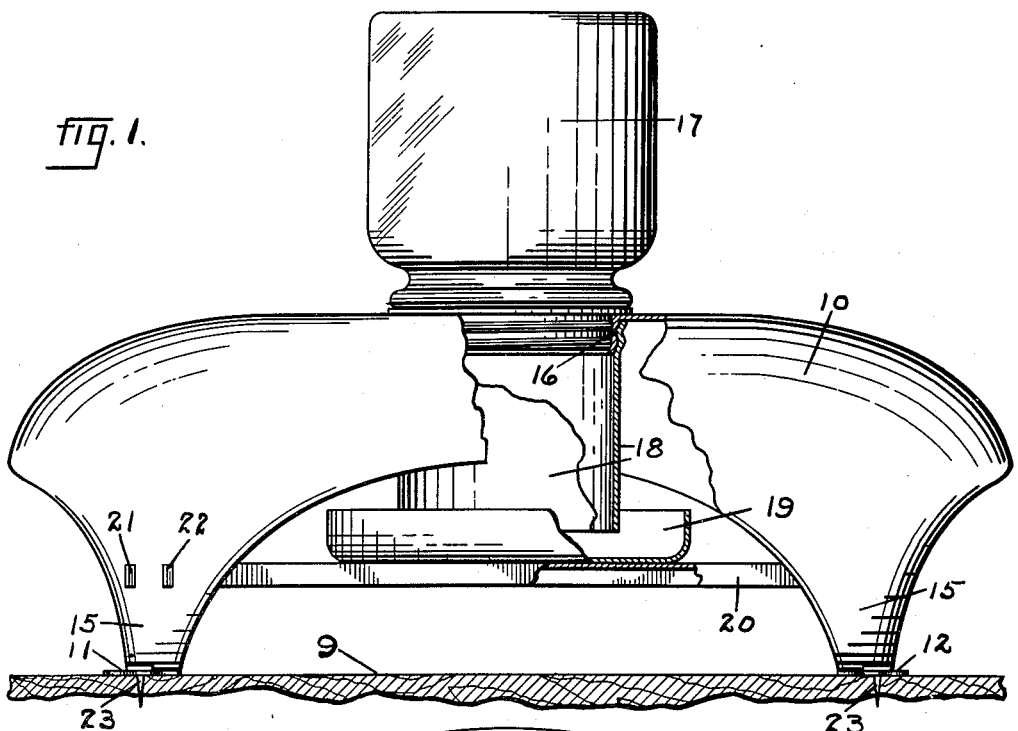
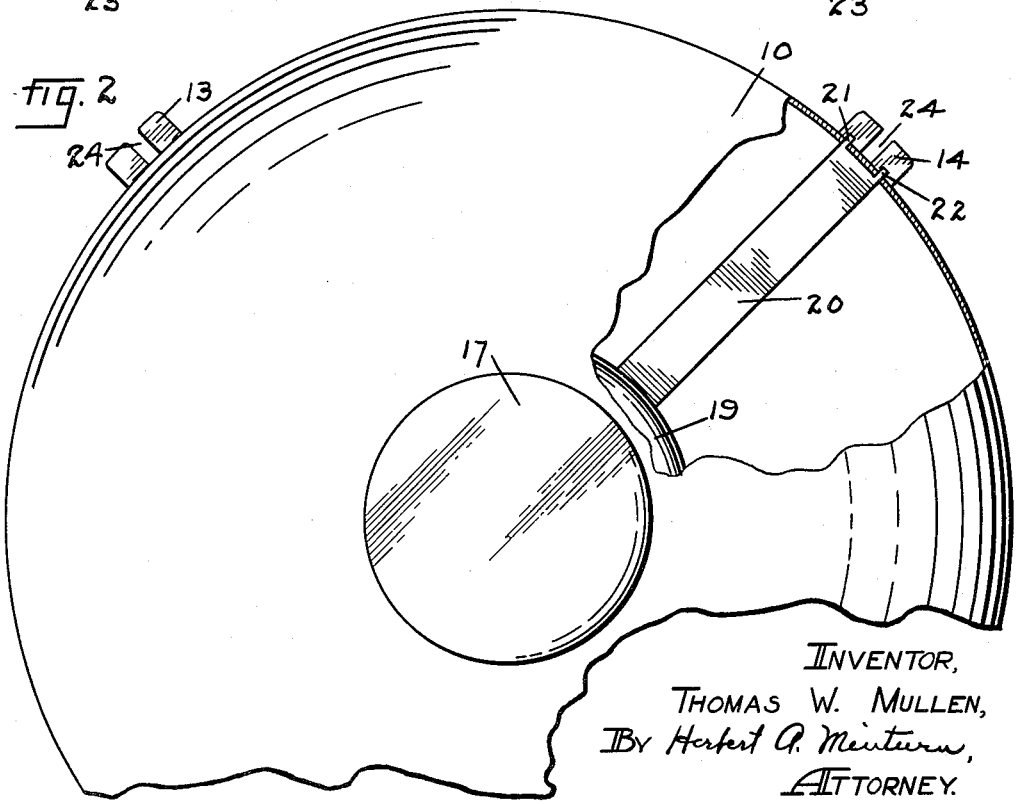
INVENTOR,
THOMAS W. MULLEN,
BY Herbert A. Meinturn,
ATTORNEY.

Dec. 6, 1955 T. W. MULLEN 2,725,663
RODENTICIDE DISPENSER
Filed Aug. 3, 1951 3 Sheets-Sheet 2
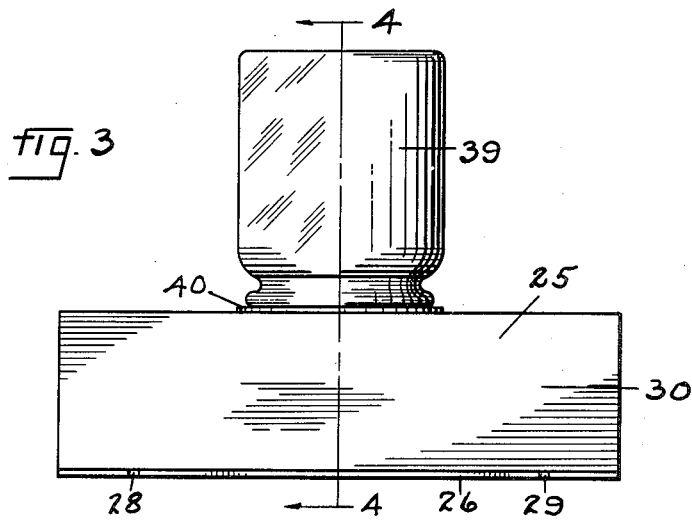
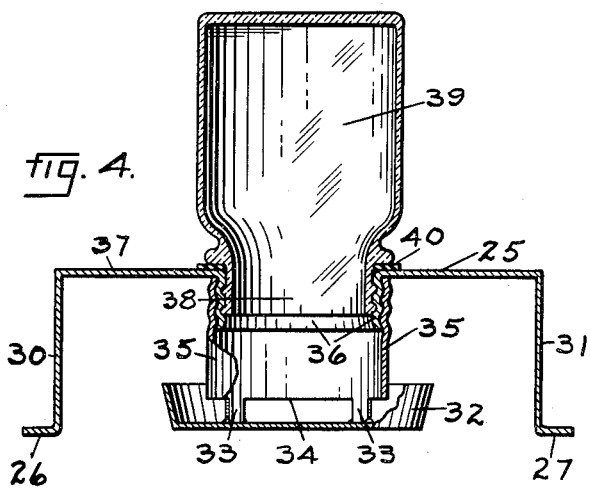
INVENTOR,
THOMAS W. MULLEN,
BY Herbert A. Minturn,
ATTORNEY.

Dec. 6, 1955      T. W. MULLEN      2,725,663
RODENTICIDE DISPENSER

Filed Aug. 3, 1951      3 Sheets-Sheet 3

INVENTOR
THOMAS W. MULLEN,
BY Hubert A. Minturn,
ATTORNEY

United States Patent Office 2,725,663
Patented Dec. 6, 1955

2,725,663

RODENTICIDE DISPENSER

Thomas W. Mullen, Evansville, Ind.

Application August 3, 1951, Serial No. 240,143

4 Claims. (Cl. 43—131)

This invention relates to a device for dispensing a bait in a granulated or meal form for the purpose of exterminating rodents such as rats and mice. The dispenser is particularly intended to be used for the compound, the chemical base of which is coumarin. The chemical formula is given as being 3-(a-acetonyl-benzyl)-4-hydroxycoumarin. This is the preparation which was developed by the Wisconsin Alumni Research Foundation, and which is being currently sold under the trade name of Warfarin, and which is described in the U. S. Patent No. 2,427,578, issued September 16, 1947.

The secret of the success of this material lies in the fact that it is mixed generally in freshly ground corn meal and when rats or mice eat it, they do not die for several days, and in fact one particular eating of the preparation will not effect a kill. One dose is not sufficient. The material has to be eaten on many days to doom any animal. However, it is highly desirable that the bait or material of this nature be fully protected against accidental consumption by animals such as dogs, cats, or pigs and the like around the farm, for instance, at least beyond one dose.

The primary object of the invention herein shown and described is to provide a dispenser of that construction which will permit rats and mice to have access to the material but which will not afford access to chickens, cats, dogs, and the like, at least to any degree which will injure the animal which might accidentally gain access to what available material is presented by the dispenser at any one time.

As is well known by this time, this coumarin material is not a poison in the sense of red squill, arsenic, strychnine, and the like, which poisons have heretofore commonly been used. The coumarin material is of that nature which prevents the clotting of blood within the body of the animal, and in fact will promote internal hemorrhages so that the animals will die slowly over a period of days. Normally one big dose of the material is ineffective, but little doses fed from day to day, such as five days in a row, is most effective. It is to prevent this continuous feeding of the material to animals not desired to be affected which is the purpose of the present invention.

A further important object of the invention is to provide an exceedingly simple structure which may be operated by any inexperienced person, and at the same time will maintain a supply of the material in a fresh condition, that is unexposed to the air as to the major part of the material so that it will feed to the actual dispensing tray in a fresh, non-rancid or non-moldy condition.

Further, the invention provides a structure which is exceedingly simple and most convenient in operation and which is also quite durable and most effective for the purpose.

The invention is described in reference to the accompanying drawings, in which

Fig. 1 is a view in side elevation and partial section of a structure embodying the invention;

Fig. 2 is a fragmentary top plan view;

Fig. 3 is a view in side elevation of a modified form of the invention;

Fig. 4 is a view in vertical transverse section on the line 4—4 of Fig. 3; and

Figure 5:
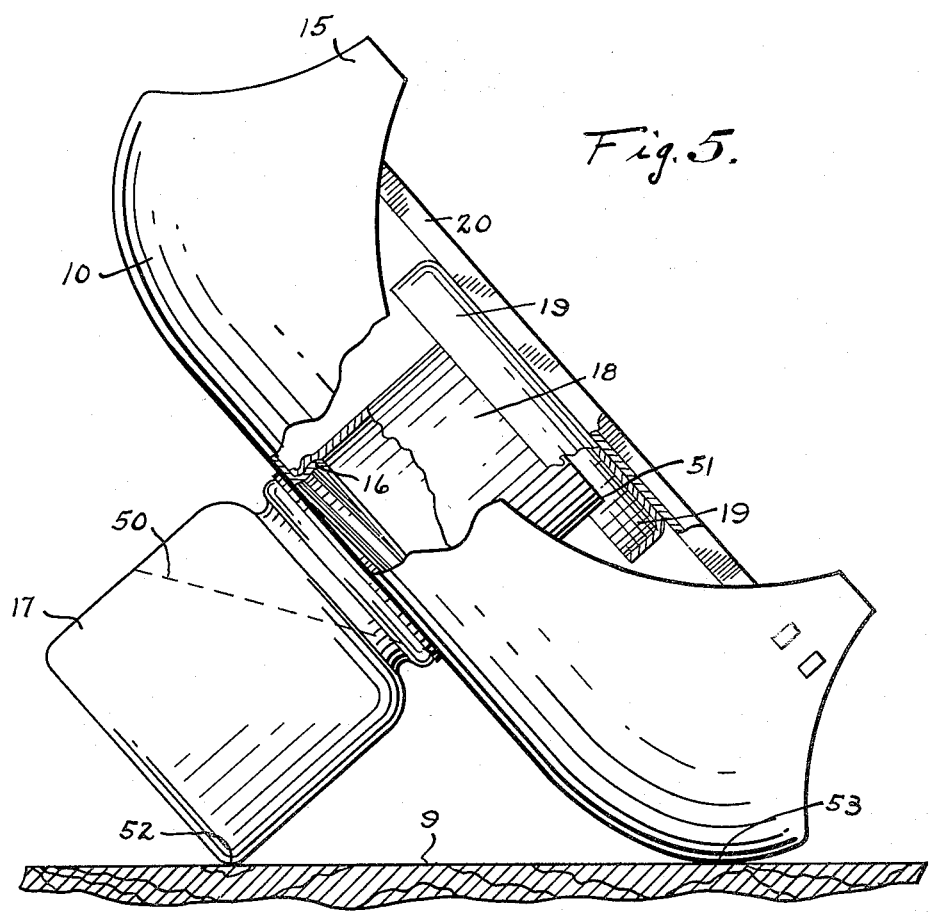
Fig. 5 is a view of the structure shown in Figs. 1 and 2 in an "upset" position.

A body 10, Fig. 1, is formed to have a number of supporting feet, herein shown as four in number and designated by the numerals 11, 12, 13, and 14. These feet in each instance are outturned from the lower ends of legs 15. Between the legs 15, there are openings through which rats or mice may enter under the body 10.

The body is provided with an upper downturned screw-threaded thimble 16 into which is screw-threaded a can or jar 17 in an inverted manner. A cylindrical sleeve 18 screw-threadedly engages externally around the thimble 16.

Supported in any suitable manner is a bait pan 19 into which the lower end of the cylindrical sleeve 18 projects, but is spaced by its lower end from the floor of that pan, as indicated in Fig. 1.

In the present instance, the pan 19 is supported upon an inverted channel 20 which is diagonally disposed across and under the body 10. The channel 20 has fingers 21 and 22 extending through the body 10, herein shown as through the leg 15, on each side. The pan 19 is rigidly secured to the channel bar 20 by any suitable means such as by spot welding, and the pan 19 may be removed by springing the opposite legs 15 apart one from the other so that the fingers 21, 22 in each instance may be dropped out of engagement therewith. The body 10 is preferably made out of sheet metal which is naturally spring-like in nature within the limits required to engage and disengage the short lengths of the fingers 21 and 22.

With the pan 19 removed, the body 10 is turned upside down, and the bait material is poured through the sleeve 18 into the jar 17 to fill it to the desired content, and while still inverted, the bar 20 with its pan 19 is placed in position by pulling apart the opposite legs 15 to permit the channel bar 20 to be sprung therebetween with the fingers 21, 22 entered through the openings provided, whereupon the legs will spring back into their normal positions to retain the bar 20 and thus support the pan 19 under the sleeve 18 when the body 10 is turned over into its upright position as indicated in Fig. 1. The material will feed down through the sleeve 18 and spread out somewhat in the pan 19. There is sufficient clearance between the top edge of the pan 19 and the underside of the body 10 to permit rats and mice to have access to the material presented in the pin around the outside of the sleeve 18. Mice may get up and perch on the bar 20 which they like to do, and thus are induced to find the material in the pan 19. There is sufficient clearance also for rats to enter between the legs 15, and reach over into the pan 19.

The diameter of the bait pan 19 and the overall diameter of the of the body 10 are made to be such that the pan 19 is not visible from the outside of the body 10 within the normal range of eyesight of a chicken or of a dog or of a cat. In any event, the material within the pan 19 is always concealed from view even though the eyesight level may be carried down below the openings between the legs 15 of the body 10.

Should an inquisitive animal such as a dog be sniffing around the dispenser and overturn the body 10, the body will tend to rock to that position where the lower end of the jar 17 will rest on the floor or the ground, so that the only material which will be spilled out will be that which is in the pan 19, and the other material will drop backwardly through the sleeve 18 toward the jar 17. The amount of material which is spilled in that manner from the pan 19 will not be sufficient to produce any injury in a dog or a cat, in at least it will afford only one dose, and as above indicated, one dose is not sufficient to cause any damage.

In Fig. 5 the structure of Figs. 1 and 2 is illustrated in the "upset" position. Here it is to be noted that when the structure is upset, the highest possible level of the rodenticide within the vessel 17 would assume an angle of repose somewhat in the plane as indicated by the dash line 50, it being noted that this line 50 is within the vessel 17. As above indicated, the vessel would be filled before it is attached to the housing 10, and then when the structure is turned over into its normal feeding position as illustrated in Figs. 1 and 2, much of the rodenticide in the vessel 17 will drop down into the sleeve 18 to rest on the pan 19. By reason of the intervening sleeve 18, when the structure is overturned as in Fig. 5, the rodenticide being limited to the capacity of the vessel 17 rather than the combined capacity of the vessel 17 and the sleeve 18, will drop entirely back into the vessel 17 so that the rodenticide cannot in any event spill over the then uppermost edge and corner 51 of the sleeve 18. As previously indicated, only that amount of rodenticide which may be in the pan 19 can possibly spill out, and also as above indicated, that pan containing rodenticide is not sufficient to cause any permanent damage to any animal eating it. This will be true regardless of how the structure may be revolved around on the ground with the two contact corners 52 of the vessel 17 and 53 of the cover serving as the riding points on the ground 9.

A very simple but most effective dispenser is shown in the form illustrated in Figs. 3 and 4 wherein there is a simple inverted trough-like housing 25 having the outturned lower flanges 26 and 27 to form feet for attachment if desired to the floor. In this connection, the flanges 26 and 27 may be slotted as at 28 and 29, Fig. 3, so that the legs 30 and 31 may be sprung inwardly one toward the other to permit the flanges 26 and 27 to engage about a nail or other means of fastening which remains in the floor, the legs being allowed to spring outwardly when the dispenser is in the desired position, and then when the dispenser is to be refilled, these legs 30 and 31 may be pressed one toward the other to permit disengagement.

In this regard, reference is again made to Figs. 1 and 2 wherein this idea is also illustrated in that each of the feet 11—14 are slotted as at 24 and a nail 23 is driven into the floor 9 to prevent displacement of the foot in each instance. Then when the device is to be refilled, the legs 15 have enough spring below the bar 20 to permit disengagement of the feet from the nails 23.

Referring again to that structure shown in Figs. 3 and 4, the bait pan 32 is secured by legs or posts 33 in spaced relation from the underedge 34 from the sleeve 35 which in turn is screw threaded around the outside of the thimble 36. This thimble 36 is downturned from the upper side 37 of the housing 25, being screw threaded to receive the sleeve 35 externally, and also to receive the neck 38 screw-threadedly inside thereof, of the jar or bottle 39. For a good tight connection, it is preferred that a rubber gasket 40 be used between the jar 39 and the top 37 when the jar is screwed into position by its neck 38 inside of the thimble 36. The housing 25 is open at both ends so that the rodents have free access, and may run entirely through the housing from end to end.

In using the form shown in Figs. 3 and 4, the housing 25 is turned upside down with the bottle or jar 39 right side up, and then the sleeve 35 is unscrewed, the pan 32 being turned therewith so that access is had directly to the mouth or neck 38 of the jar 39 for filling. In this case, the pan 32 is substantially at the plane across the undersides of the flanges 26 and 27.

It is to be seen that in this form in Figs. 3 and 4, any accidental upsetting of the structure will cause the small amount of bait material in the pan 32 to spill out inside of the housing 25 since the tendency would be for the jar 39 to tilt laterally with the housing rather than from end to end. In any event, the material in the major portion will fall back into the jar 39, and only a very small portion in the bottom of the pan 32 will spill out.

Thus it is to be seen that all of the forms of the invention have in common that structural feature of preventing any excessive amount of the bait material from becoming exposed unwarrantly even though the dispenser be upset. In each of the forms, the material is held in a vessel to prevent all of the material from being exposed at one time to the atmosphere which would produce deterioration.

Therefore while these forms have been described in minute detail, it is obvious that structural changes may be embodied in the invention without departing from the spirit thereof, and I therefore do not desire to be limited to such forms beyond the limitations which may be imposed by the following claims.

I claim:
1. A rodenticide dispenser comprising a rodenticide container closed at its top end and open at its bottom end; a pan across and spaced below said bottom end adapted for receiving rodenticide from the container; and a member spaced below said container top end and extending laterally beyond the container and pan, and having a periphery which, in an overturned position of the container with said top end bearing upon a floor or the ground normally supporting the dispenser, also bears on the floor or ground and spaces the container bottom end upwardly in all positions of rolling of the dispenser around on said top end and said periphery, at an angle of inclination retaining said rodenticide in the container at least at its angle of repose at the edge of said bottom end.

2. The structure of claim 1 in which said member conceals said pan and the periphery of said member is located intermediate the top and bottom ends of said container.

3. The structure of claim 1 in which said member covers over said pan and turns downwardly therearound and has pan feeding access openings limited in height in its downwardly extending portion concealing the contents of said pan from direct line of sight from the outside of said member.

4. The structure of claim 1 in which said member is dome-like in shape dropping downwardly about and concealing said pan, and has side access openings in the dropping portion, and said periphery is above said access openings.

References Cited in the file of this patent
UNITED STATES PATENTS

| | | |
|---|---|---|
| D. 128,787 | Nelson | Aug. 12, 1941 |
| 640,730 | Smith | Jan. 2, 1900 |
| 1,091,392 | Schlichtinger | Mar. 24, 1914 |
| 1,113,842 | Sill | Oct. 13, 1914 |
| 1,113,887 | Dragon et al. | Oct. 13, 1914 |
| 1,497,596 | Scott | June 10, 1924 |
| 1,994,859 | Langum | Mar. 19, 1935 |
| 2,239,937 | Smith | Apr. 29, 1941 |
| 2,480,724 | Feussner | Aug. 30, 1949 |